United States Patent
Kageyama et al.

(10) Patent No.: US 9,344,015 B2
(45) Date of Patent: May 17, 2016

(54) VARIABLE SPEED CONTROL APPARATUS AND OPERATION METHOD

(71) Applicant: KABUSHIKI KAISHA TOSHIBA, Minato-ku, Tokyo (JP)

(72) Inventors: Takahisa Kageyama, Ichikawa (JP); Takashi Fujita, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 94 days.

(21) Appl. No.: 14/280,938

(22) Filed: May 19, 2014

(65) Prior Publication Data
US 2014/0361718 A1 Dec. 11, 2014

(30) Foreign Application Priority Data

May 24, 2013 (JP) ................................ 2013-110123

(51) Int. Cl.
*H02H 7/122* (2006.01)
*H02P 6/00* (2016.01)

(52) U.S. Cl.
CPC ..................................... *H02P 6/002* (2013.01)

(58) Field of Classification Search
CPC . H02P 27/08; H02P 21/0089; H02P 2207/05; H02P 25/026; H02P 6/14; H02P 25/023; H02P 6/005; B60L 2240/421; B60L 2240/423; F03D 7/0224; H02K 19/28; H02K 21/042; H02K 21/12; H02K 21/14; H02K 29/08; H02K 29/00; H02K 29/14; Y02T 10/643; F02N 2011/0896; H02H 7/0833
USPC .......... 318/400.26, 400.13, 400.23, 700, 523, 318/719, 721, 802, 400.22, 712; 290/44, 290/55, 40 C; 310/180; 363/41, 131, 37, 13, 363/34, 56.06, 56.01, 56.1, 56.02; 322/29, 322/25, 17
See application file for complete search history.

(56) References Cited

U.S. PATENT DOCUMENTS 5,148,093 A * 9/1992 Bando ....................... H02P 9/10
   318/723
5,239,251 A * 8/1993 Lauw ..................... H02P 6/005
   290/31

(Continued)

FOREIGN PATENT DOCUMENTS

DE   10 2006 027465 A1   12/2007
EP      0 688 095 A2   12/1995

(Continued)

OTHER PUBLICATIONS

European Search Report for EPO Application No. 14169703.0 dated Mar. 20, 2015 (8 pages).

(Continued)

*Primary Examiner* — Rita Leykin
(74) *Attorney, Agent, or Firm* — Finnegan, Henderson, Farabow, Garrett & Dunner, LLP

(57) ABSTRACT

According to one embodiment, there is provided a variable speed control apparatus applied to a variable speed system of secondary excitation including a double feed synchronous machine and a frequency converter. The variable speed control apparatus includes a secondary current controller configured to control an output current from the frequency converter, and a secondary current limiter configured to limit an effective component current command and a reactive component current command of a secondary current for the secondary current controller by using a given secondary current limit value and output a limited result to the secondary current controller.

8 Claims, 11 Drawing Sheets

(56) References Cited

U.S. PATENT DOCUMENTS

| | | | | |
|---|---|---|---|---|
| 5,798,631 | A * | 8/1998 | Spee | F03D 7/0272 290/31 |
| 6,825,632 | B2 * | 11/2004 | Hahn | H02P 6/002 318/369 |
| 7,495,936 | B2 * | 2/2009 | Ohshima | H02M 1/126 363/34 |
| 8,053,917 | B2 * | 11/2011 | Wakasa | F03D 7/0272 290/44 |
| 8,111,048 | B2 * | 2/2012 | Kenzaki | H02P 9/007 322/29 |
| 8,115,445 | B2 * | 2/2012 | Oyake | H02P 1/50 318/400.01 |
| 8,242,753 | B2 * | 8/2012 | Engelhardt | H02P 9/007 322/20 |
| 8,247,917 | B2 * | 8/2012 | Yasugi | F03D 9/021 290/44 |
| 8,264,209 | B2 * | 9/2012 | Kretschmann | H02P 9/007 290/40 C |
| 8,502,406 | B2 * | 8/2013 | Wakasa | F03D 7/0272 290/44 |
| 8,519,653 | B2 * | 8/2013 | Takamatsu | H02P 27/08 318/400.13 |
| 8,659,178 | B2 * | 2/2014 | Arlaban | F03D 7/0284 290/44 |
| 9,077,268 | B2 * | 7/2015 | Ishizuki | H02P 9/08 |
| 9,093,924 | B2 * | 7/2015 | Gupta | H02J 3/386 |
| 2003/0052643 | A1 * | 3/2003 | Sweo | H02P 9/007 318/801 |

FOREIGN PATENT DOCUMENTS

| | | |
|---|---|---|
| EP | 2 224 129 A2 | 9/2010 |
| JP | 2851490 | 11/1995 |
| JP | 9-37596 | 2/1997 |
| JP | 4564192 | 8/2010 |

OTHER PUBLICATIONS

European Search Report for EPO Application No. 14169706.0 dated Mar. 20, 2015 (8 pages).

* cited by examiner

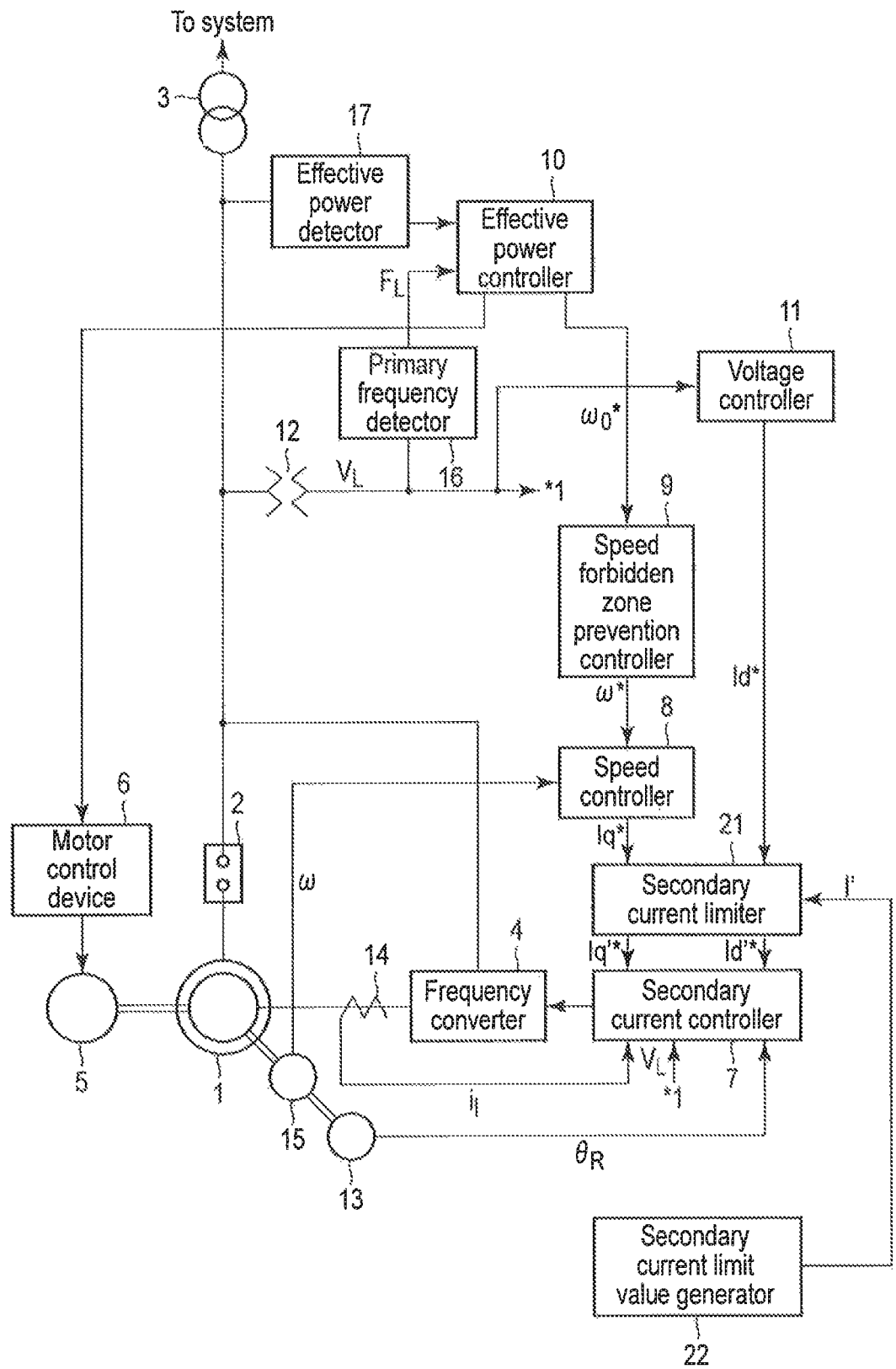
F I G. 1

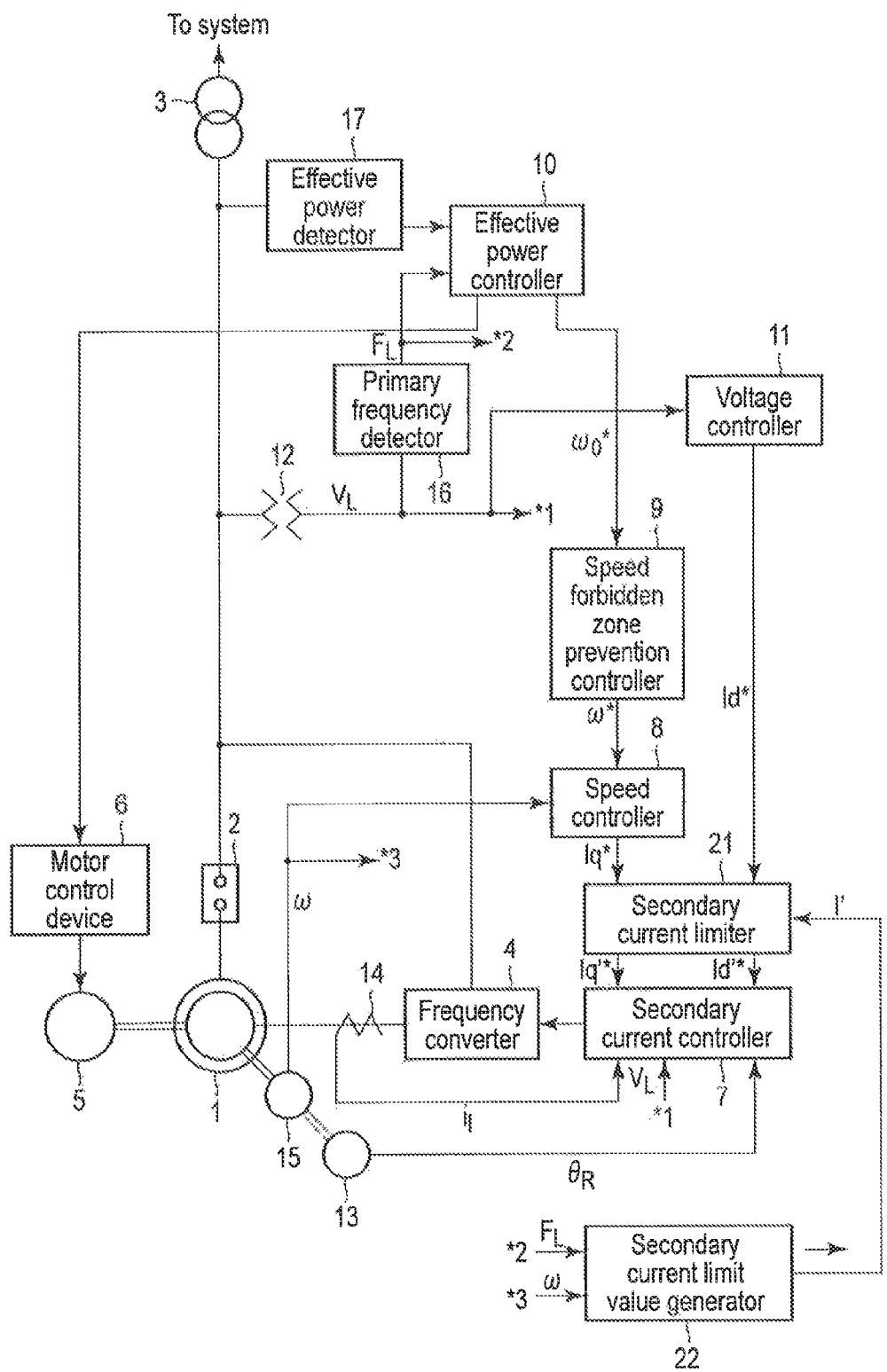
F I G. 4

VARIABLE SPEED CONTROL APPARATUS AND OPERATION METHOD

CROSS-REFERENCE TO RELATED APPLICATIONS

This application is based upon and claims the benefit of priority from prior Japanese Patent Applications No. 2013-110123, filed May 24, 2013, the entire contents of which are incorporated herein by reference.

FIELD

Embodiments described herein relate generally to a variable speed control apparatus and an operation method which are applied to a variable speed system of secondary excitation.

BACKGROUND

In a variable speed system of secondary excitation, a frequency converter operates with a low-frequency output current. Since the low-frequency output current near a synchronous speed becomes a very low frequency current, a time during which a current near to a peak value flows in an element prolongs. For this reason, the element is overheated. In the worst case, the element may fail. In particular, the current is DC current at a synchronous speed. When the peak current continuously flows in the element, the operation condition is severer than that at the very low frequency.

As a method of operating the variable speed system of secondary excitation near the synchronous speed, a method of monitoring the temperature of an element, stopping the frequency converter by a protection circuit at a high temperature, and controlling the operation so as not to stay the system in a speed forbidden zone near the synchronous speed is available.

As shown in FIG. 10, a conventional variable speed system of secondary excitation including a variable speed control apparatus includes, as main components, a double feed synchronous machine 1 mechanically connected to a motor, a generator-side breaker 2 connected to the primary side of the double feed synchronous machine 1, a main voltage transformer 3 capable of performing voltage regulation by tap switching, a frequency converter 4 for supplying a current to the secondary winding of the double feed synchronous machine 1, and a motor 5 directly connected to the rotating shaft of the double feed synchronous machine 1. In addition, the variable speed system includes, as various kinds of control devices, a motor control device 6, a secondary current controller 7, a speed controller 8, a speed forbidden zone prevention controller 9, an effective power controller 10, and a voltage controller 11. The variable speed system further includes, as various kinds of detectors, a voltage detector 12, a phase detector 13, a secondary current detector 14, a rotation speed detector 15, a primary frequency detector 16, and an effective power detector 17.

The voltage detector 12 detects a primary voltage or system voltage $V_L$ of the double feed synchronous machine 1. The phase detector 13 detects a rotation phase $\theta_R$ of the double feed synchronous machine 1. The secondary current detector 14 detects a secondary current $i_I$ of the double feed synchronous machine 1. The rotation speed detector 15 detects a rotation speed $\omega$ of the double feed synchronous machine 1. The primary frequency detector 16 detects a primary frequency $F_L$ from the primary voltage $V_L$. The effective power detector 17 detects an effective power from the primary side of the double feed synchronous machine 1.

The effective power controller 10 determines a target speed value $\omega_0^*$ from the effective power and the primary frequency $F_L$ and outputs the target speed value. The voltage controller 11 determines a reactive component current command Id* from the primary voltage $V_L$ or the like, and outputs the reactive component current command Id*. The speed forbidden zone prevention controller 9 adjusts a speed command value $\omega^*$ in accordance with whether the target speed value $\omega_0^*$ passes through the speed forbidden zone and outputs the speed command value $\omega_0^*$. The speed controller 8 determines an effective component current command Iq* of the secondary current from the rotation speed $\omega$ and the speed command value $\omega^*$ of the double feed synchronous machine 1, and outputs the effective component current command Iq* of the secondary current. The secondary current controller 7 generates a gate pulse to be output to the frequency converter 4, based on the effective component current command Iq*, the reactive component current command Id*, the secondary current $i_I$, the primary voltage $V_L$, and the rotation phase $\theta_R$ and controls the output current of the frequency converter 4 based on the gate pulse. The motor control device 5 controls the mechanical input/output of the motor 5.

The secondary current controller 7 includes a phase reference operation unit 71, an effective and reactive component operation unit 72, subtractors 73 and 75, controllers 74 and 76, an output voltage operation unit 77, a triangular wave generator 78, a gate pulse generator 79, and an AND circuit 7A, as shown in FIG. 11.

The phase reference operation unit 71 calculates a converter current phase reference $\theta_{I0}$ from the primary voltage $V_L$ detected by the voltage detector 12 and the rotation phase $\theta_R$ detected by the phase detector 13. The effective and reactive component operation unit 72 calculates an effective component current Iq and a reactive component current Id from the converter current phase reference $\theta_{I0}$ and the secondary current detected by the current detector 14. The subtractor 73 obtains a deviation between the effective component current command Iq* output from the speed controller 8 and the effective component current Iq and sends this deviation to the controller 74. Similarly, the subtractor 75 obtains a deviation between the reactive component current command Id* output from the voltage controller 11 and the reactive component current Id and sends this deviation to the controller 76. The output voltage operation unit 77 calculates an output voltage $V_I$ from an effective component output voltage Vq* output from the controller 74, a reactive component output voltage Vd* output from the controller 76, and the converter current phase reference $\theta_{I0}$. The triangular wave generator 78 generates a triangular wave CRY based on an oscillation frequency OCS. The gate pulse generator 79 outputs a gate pulse to the frequency converter 4 via the AND circuit 7A at a timing determined by an intersection between the output voltage $V_I$ and the triangular wave CRY. Note that when the AND circuit 7A receives a gate block (GB) signal, the circuit 7A blocks the gate pulse to stop the frequency converter 4.

The speed controller 8 includes a subtractor 81 and a controller 82, as shown in FIG. 12.

The subtractor 81 obtains a deviation between the speed command value $\omega^*$ output from the speed forbidden zone prevention controller 9 and the rotation speed $\omega$ detected by the rotation speed detector 15 and sends this deviation to the controller 82. Upon reception of the deviation obtained by the subtractor 81, the controller 82 sends an output 8a as the effective component current command. Iq* to the secondary current controller 7.

The speed forbidden zone prevention controller 9 includes a hysteresis function means 91 and a change rate limiter 92, as shown in FIG. 13.

Upon reception of the target speed value $\omega_0^*$ from the effective power controller 10, the hysteresis function means 91 sends an output 9a to the change rate limiter 92. The change rate limiter 92 sends an output 9b as the speed command value $\omega^*$ to the speed controller 8. Note that the relationship between the input $\omega_0^*$ and an output 91a of the hysteresis function means 91 is shown in FIG. 14. That is, Assuming that $\omega_0^*$ increases, if $\omega_0^* < \omega'_L$ or $\omega'_U < \omega_0^*$, then $\omega^* = \omega_0^*$, if $\omega'_L \leq \omega_0^* \leq \omega'_U$, then $\omega^* = \omega'_L$ Assuming that $\omega_0^*$ decreases, if $\omega_0^* < \omega'_L$ or $\omega'_U < \omega_0^*$, then $\omega^* = \omega_0^*$, if $\omega'_L \leq \omega_0^* \leq \omega'_U$, then $\omega^* = \omega'_U$ FIG. 15 shows the characteristic of the speed command value $\omega^*$ by the above method. Even if the target speed value $\omega_0^*$ passes through the speed forbidden zone from time t1 to time t2, the speed command value $\omega^*$ waits at a forbidden zone lower limit speed until time t2 and passes through the forbidden zone within a short period of time from time t2 to time t3.

In the related art, the speed command value quickly passes through the speed forbidden zone to reduce the load on the element while the speed command value passes through the speed forbidden zone. However, when the shaft input/output of the motor increases as in adjacent machine breaking, it is not inevitably prevent an increase in output current of the frequency converter under the above control. The element may damage. It is also proposed that the load of the element is reduced while the speed command value passes through the speed forbidden zone by narrowing down the converter current. However, when the current is narrowed down, the forbidden zone passing time prolongs to increase the load of the element. The element may damage.

Under these circumstances, it is desired to provide a variable speed control apparatus and its operation method capable of continuing safety operation without overloading the element of the frequency converter even if a disturbance or the like occurs.

BRIEF DESCRIPTION OF THE DRAWINGS

FIG. 1 is a block diagram showing an example of the arrangement of a variable speed system of secondary excitation including a variable speed control apparatus according to a first embodiment;

FIG. 4 is a block diagram showing an example of the arrangement of a variable speed system of secondary excitation including a variable speed control apparatus according to a second embodiment;

DETAILED DESCRIPTION

Figure 2:
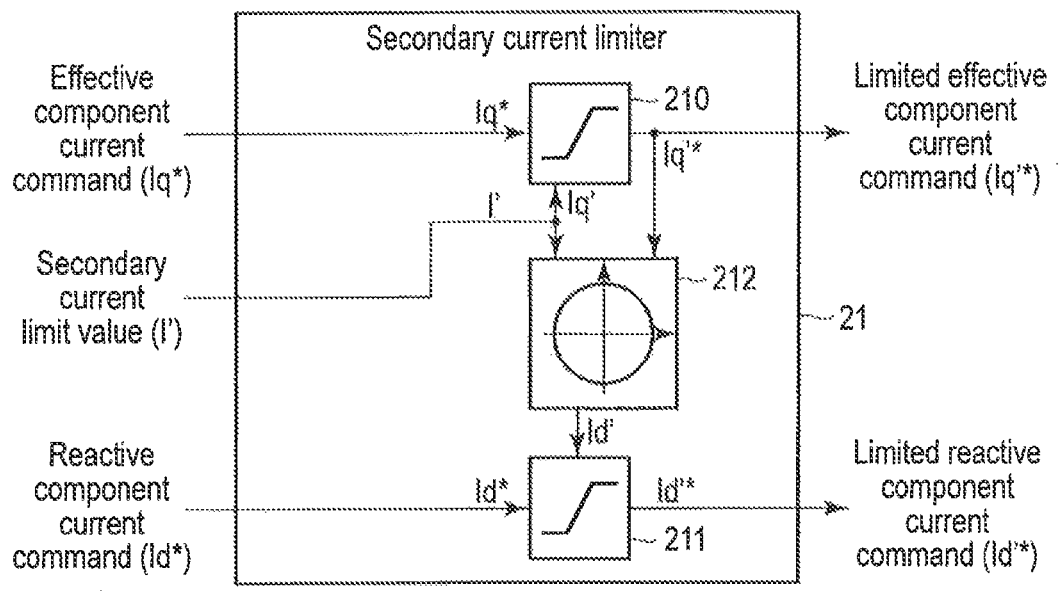
FIG. 2 is a block diagram showing an example of the internal arrangement of a secondary current limiter 21 shown in FIG. 1.

In general, according to one embodiment, there is provided a variable speed control apparatus applied to a variable speed system of secondary excitation including a double feed synchronous machine mechanically connected to a motor and a frequency converter configured to supply a current to a secondary winding of the double feed synchronous machine. The variable speed control apparatus includes a secondary current controller configured to control, an output current from the frequency converter, and a secondary current limiter configured to limit an effective component current command and a reactive component current command of a secondary current for the secondary current controller by using a given secondary current limit value and output a limited result to the secondary current controller.

Embodiments will now be described with reference to the accompanying drawings.

First Embodiment

First of all, the first embodiment will be described with reference to FIGS. 1, 2, and 3.

In the following description, different parts from a conventional variable speed system (FIGS. 10, 11, 12, 13, 14, and 15) will be mainly described.

FIG. 1 is a block diagram showing an example of the arrangement of a variable speed system of secondary excitation including a variable speed control apparatus according to the first embodiment. This system is applicable to a variable speed pumping-up power generation system. Note that the same reference numerals as in FIG. 10 denote the same parts, and a repetitive description will be omitted.

Figure 10:
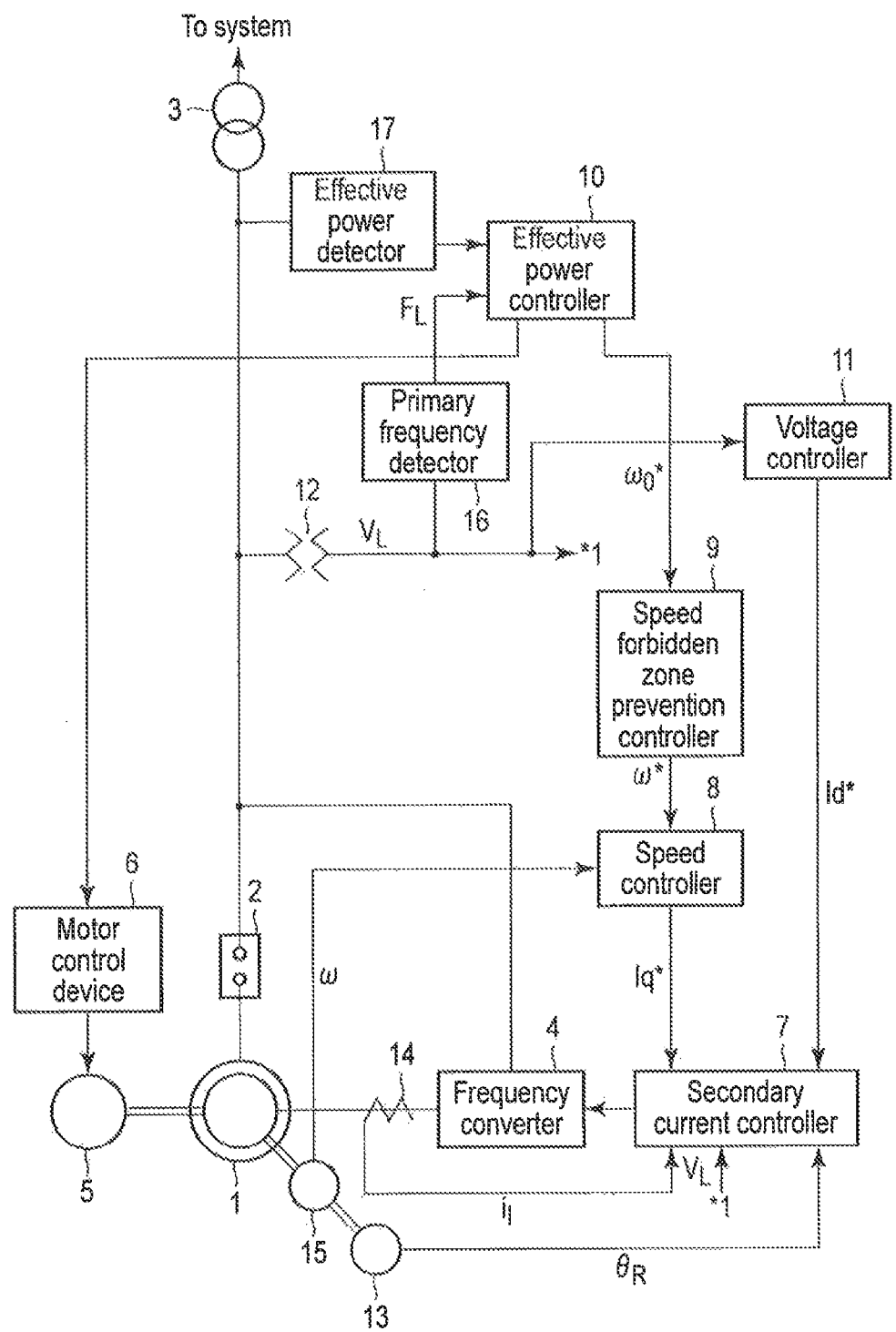
FIG. 10 is a block diagram showing an example of the arrangement of a conventional variable speed system of secondary excitation including a variable speed control apparatus.
Figure 11:
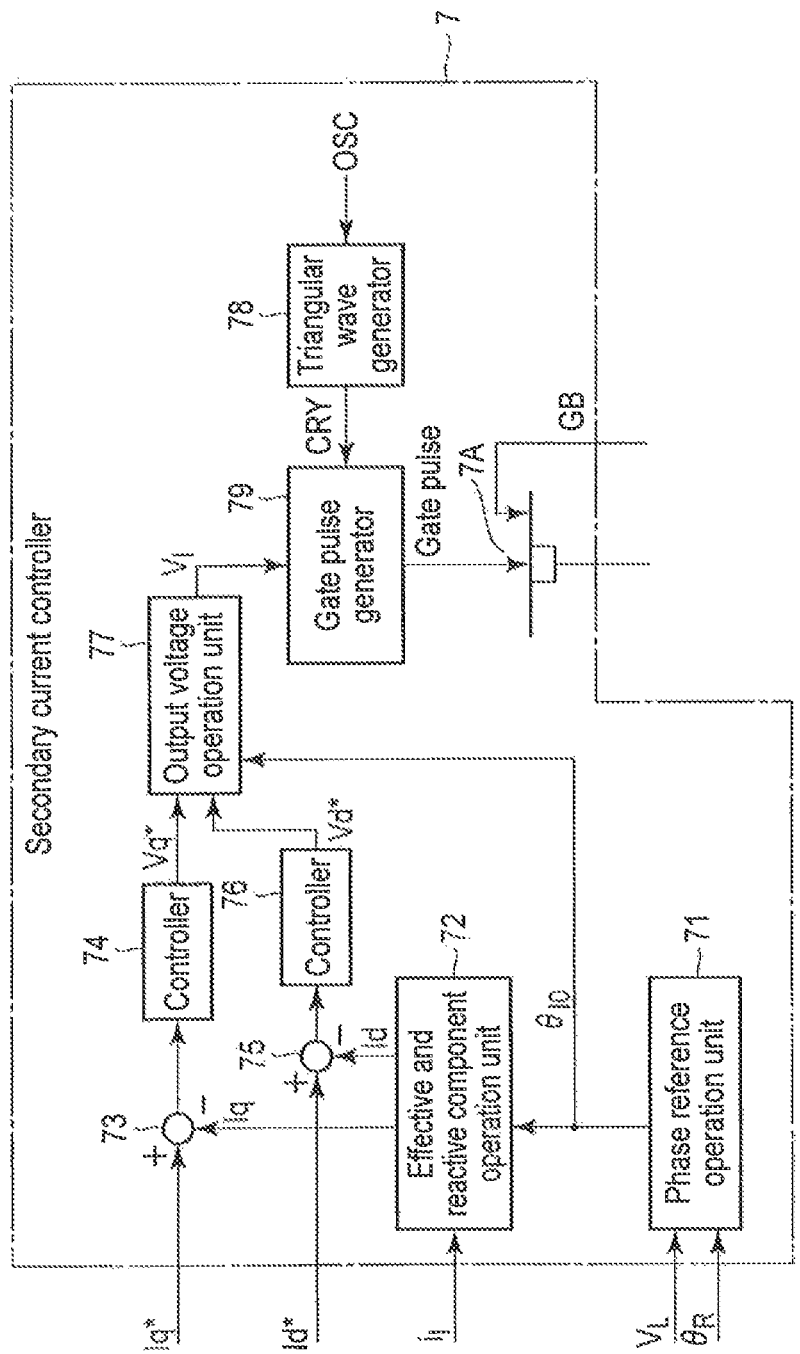
FIG. 11 is a block diagram showing an example of the internal arrangement of a secondary current controller 7 shown in FIG. 10.
Figure 12:
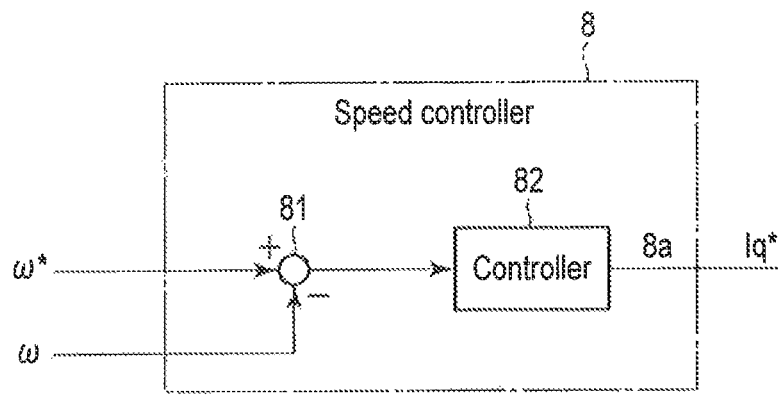
FIG. 12 is a block diagram showing an example of the internal arrangement of a speed controller 8 shown in FIG. 10.
Figure 13:
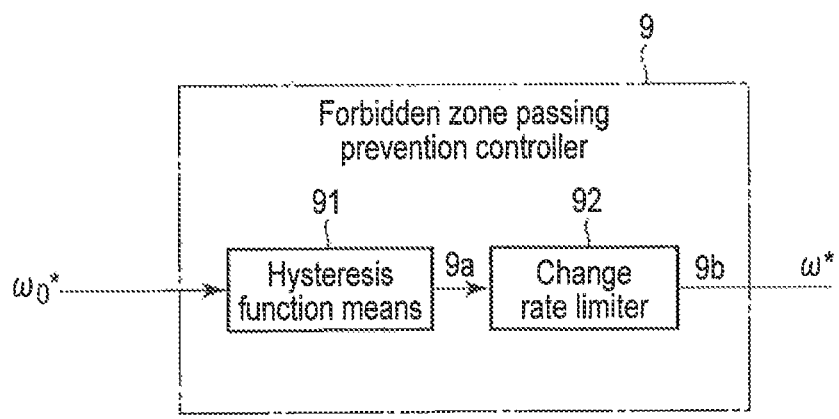
FIG. 13 is a block diagram showing an example of the internal arrangement of a speed forbidden zone prevention controller 9 shown in FIG. 10.
Figure 14:
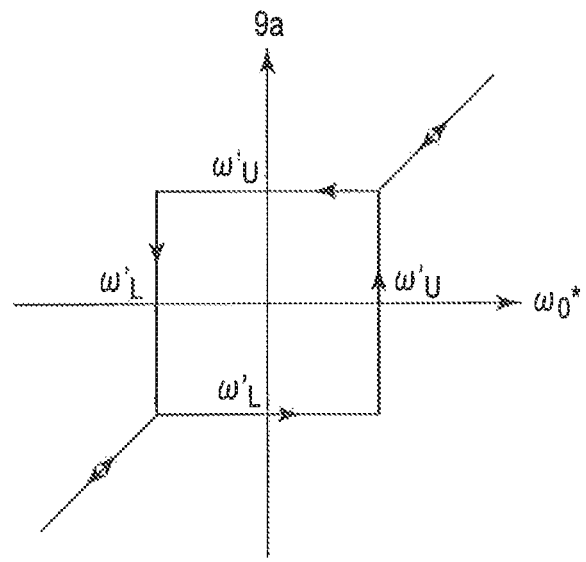
FIG. 14 is a graph showing the relationship between the input and output of a hysteresis function means 91 shown in FIG. 13.
Figure 15:
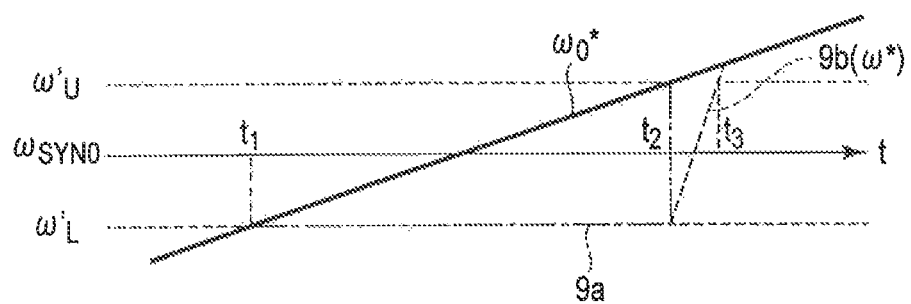
FIG. 15 is a graph showing the characteristic of a speed command value based on the relationship shown in FIG. 14.

The variable speed system according to the first embodiment shown in FIG. 1 includes a secondary current limiter 21 and a secondary current limit value generator 22 in addition to the arrangement shown in FIG. 10.

The secondary current limiter 21 limits an effective component current command Iq* and reactive component current command Id* of a secondary current for a secondary current controller 7 in accordance with a given secondary current limit value I'. The secondary current limiter 21 then outputs a limited effective component current command Iq'* and a limited reactive component current command Id'* to the secondary current controller 7. The secondary current limit value generator 22 generates the secondary current limit value I' used to limit the effective component current command Iq* and the reactive component current command Id* in the secondary current limiter 21 and outputs the secondary current limit value I' to the secondary current limiter 21. The secondary current limit value I' may be variable.

FIG. 2 is a block diagram showing an example of the internal arrangement of the secondary current limiter 21 shown in FIG. 1.

The secondary current limiter 21 includes an effective component current command limiter 210, a reactive component current command limiter 211, and a reactive component current command limit value generator 212.

The effective component current command limiter 210 handles the secondary current limit value I' output from the secondary current limit value generator 22 as an effective component current command limit value Iq'. The limiter 210 uses this effective component current command limit value Iq' to limit the effective component current command Iq* output from a speed controller 8. The limiter 210 then outputs the limited effective component current command Iq'* to the secondary current controller 7.

For example, when the effective component current command Iq* exceeds the effective component current command limit value Iq', the limited effective component current command Iq'* has the same value as that of the effective component current command limit value Iq'. To the contrary, when the effective component current command Iq* does not exceed the effective component current command limit value Iq', the limited effective component current command Iq'* has the same value as that of the effective component current command Iq*.

Using a predetermined function, the reactive component current command limit value generator 212 calculates a reactive component current command limit value Id' from the effective component current command Ig'* limited by the effective component current command limiter 210 and the secondary current limit value I'.

In accordance with the reactive component, current command limit value Id' calculated by the reactive component current command limit value generator 212, the reactive component current command limiter 211 limits the reactive component current command Id* output from a voltage controller 11. The limiter 211 outputs the limited reactive component current command Id'* to the secondary current controller 7.

For example, when the reactive component current command Id* exceeds the reactive component current command limit value Id', a limited reactive component current command Id'* has the same value as that of the reactive component current command limit value Id'. To the contrary, when the reactive component current command Id* does not exceed the reactive component current command limit value Id', the limited reactive component current command Id* has the same value as that of the reactive component current command Id*.

As a result, the secondary current controller 7 receives the limited effective component current command Iq'* and the limited reactive component current command Id'* in place of the effective component current command Iq* and the reactive component current command Id'*. That is, the secondary current controller 7 performs the same processing as described with reference to FIG. 11, based on the limited effective component current command Iq'*, the limited reactive component current command Id'* a secondary current $i_r$, a primary voltage $V_L$, and a rotation phase $\theta_R$, thereby generating a gate pulse to be output to a frequency converter and controlling the output current from the frequency converter 4.

The reactive component current command limit value Id' calculated by the reactive component current command limit value generator 212 is expressed as a function of the limited effective component current command Iq'* and the secondary current limit value I':

$$Id' = \pm\sqrt{(I'^2 - Ig'^{*2})}$$

Figure 3:
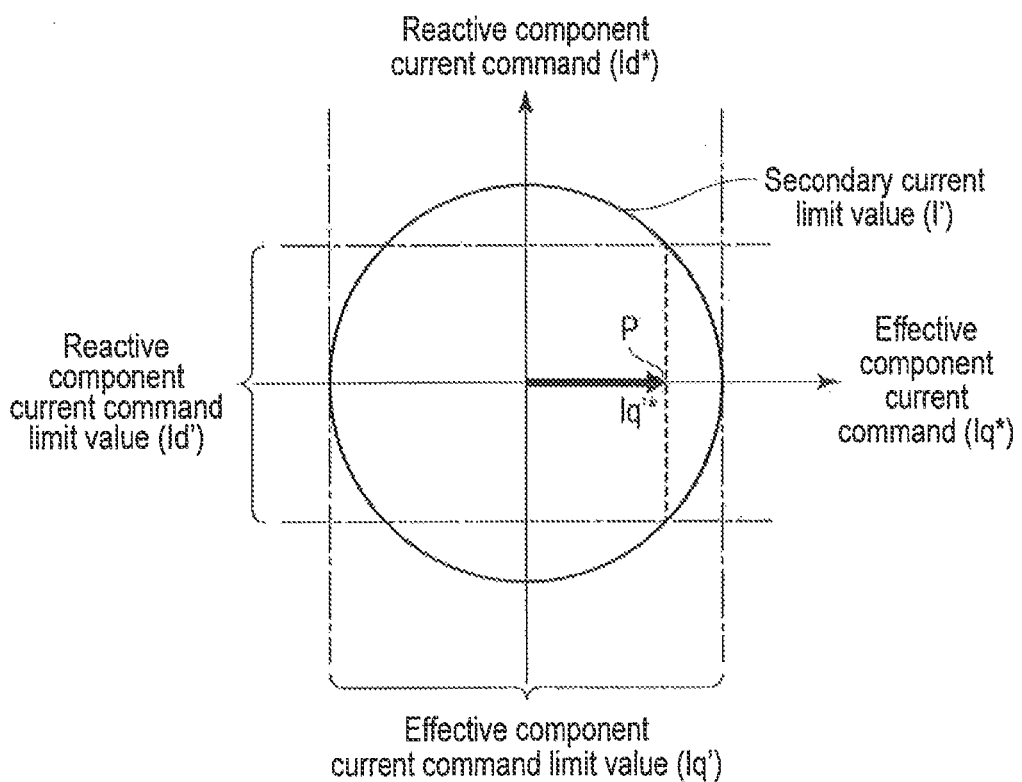
FIG. 3 is a graph showing the characteristic of a function used by a reactive component current command limit value generator 212 shown in FIG. 2.

FIG. 3 shows the characteristic of this function. FIG. 3 is a two-dimensional graph by plotting the effective component current command Iq* along the abscissa and the reactive component current command Id* along the ordinate. Intersections between a unit circle having the secondary current limit value I' as a radius and a straight line parallel to the ordinate and passing through a point P at which the limited effective component current command Iq' on the abscissa is located are obtained. Values obtained by mapping the intersections on the ordinate are defined as the reactive component current command limit value Id'.

According to the first embodiment, the effective component current command and reactive component current command of the secondary current are limited by the secondary current limit value. Even if a disturbance occurs, the element of the frequency converter is not overloaded, and safety operation can continue. In addition, the effective component current is preferentially limited. In particular, this makes it possible to more effectively reduce the load on the element while the speed command value passes through the forbidden zone, thereby preventing the damage to the element. Since the secondary current limit value can be made variable, it is possible to appropriate limit the secondary current depending on the operation condition. Even if the secondary current limit value is made variable, the effective component current can be preferentially limited without making the secondary current command fall outside the secondary current limit value. This makes it possible to more effectively reduce the load on the element and prevent damage to the element.

Second Embodiment

The second embodiment will be described with reference to FIGS. 4, 5, 6, and 7.

Different carts from the variable speed system (FIGS. 1, 2, and 3) of the first embodiment will be mainly described below.

FIG. 4 is a block diagram showing an example of the arrangement of a variable speed system of secondary excitation including a variable speed control apparatus according to the second embodiment. The same reference numerals as in FIG. 1 denote the same parts, and a repetitive description will be omitted.

The variable speed system according to the second embodiments in FIG. 4 is different from the arrangement in FIG. 1 in an arrangement including an input to a secondary current limit value generator 22.

More specifically, the secondary current limit value generator 22 receives a primary frequency $F_L$ detected by a primary frequency detector 16 and a rotation speed ω detected by a rotation speed detector 15 and calculates a slip frequency S from the primary frequency $F_L$ and the rotation speed ω, thereby determining a secondary current limit value I' in accordance with the slip frequency S.

When the slip frequency S does not pass through a predetermined forbidden zone, the secondary current limit value generator 22 sets the secondary current limit value I' to a first value (for example, a rated current value of a frequency converter 4). When the slip frequency S passes through the forbidden zone, the secondary current limit value generator 22 sets the secondary current limit value I' to a second value for example, an allowable current value when the slip frequency passes through the forbidden zone) smaller than the first value.

Figure 5:
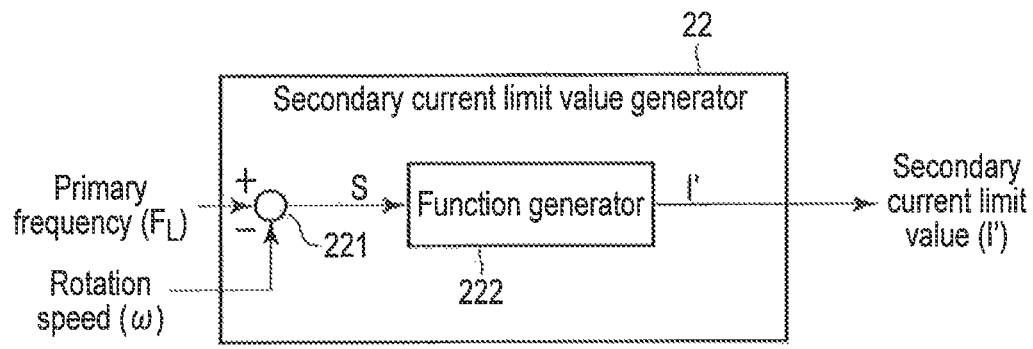
FIG. 5 is a block diagram showing an example of the internal arrangement of a secondary current limit value generator 22 shown in 4.

FIG. 5 is a block diagram showing an example of the internal arrangement of the secondary current limit value generator 22 shown in FIG. 4. The secondary current limit value generator 22 includes a subtractor 221 and a function generator 222.

The subtractor 221 calculates the slip frequency S from the difference between the rotation speed ω and the primary frequency $F_L$. The function generator 222 uses a predetermined function to determine the secondary current limit value I' from the slip frequency S.

In this system, a one-to-one correspondence determined by the number of poles of a double feed synchronous machine 1 is given between the rotation speed ω and the primary frequency $F_L$. The rotation speed ω and the primary frequency $F_L$ have the same value when they are expressed using pu values. For this reason, the frequency and speed can be dealt as identical quantities. The slip frequency S can be defined by $$S = \omega - F_L$$

Figure 6:
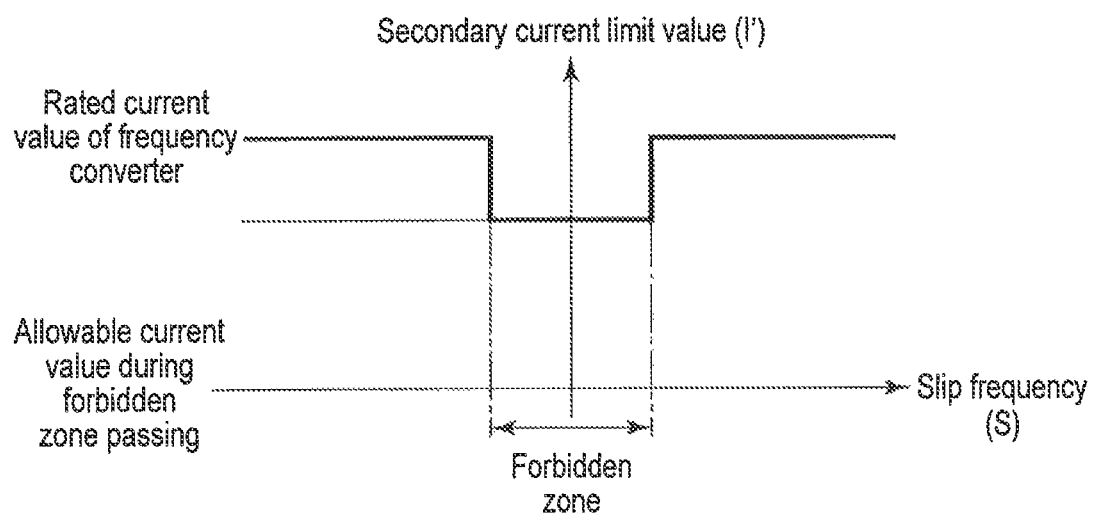
FIG. 6 is a graph showing the characteristic of a function used in a function generator 222 shown in FIG. 5.

The function generator 222 receives the slip frequency S calculated by the subtractor 221 and outputs the secondary current limit value I' corresponding to the slip frequency S. FIG. 6 shows the characteristic of the function used in the function generator 222.

FIG. 6 is a graph obtained by plotting the slip frequency S along the abscissa and the secondary current limit value I' along the ordinate. The secondary current limit value I' is set to be small as a forbidden zone passing allowable current value only during an interval defined as the forbidden zone. The secondary current limit value I' is given as the rated current value of the frequency converter 4 in an interval except the forbidden zone.

Figure 7:
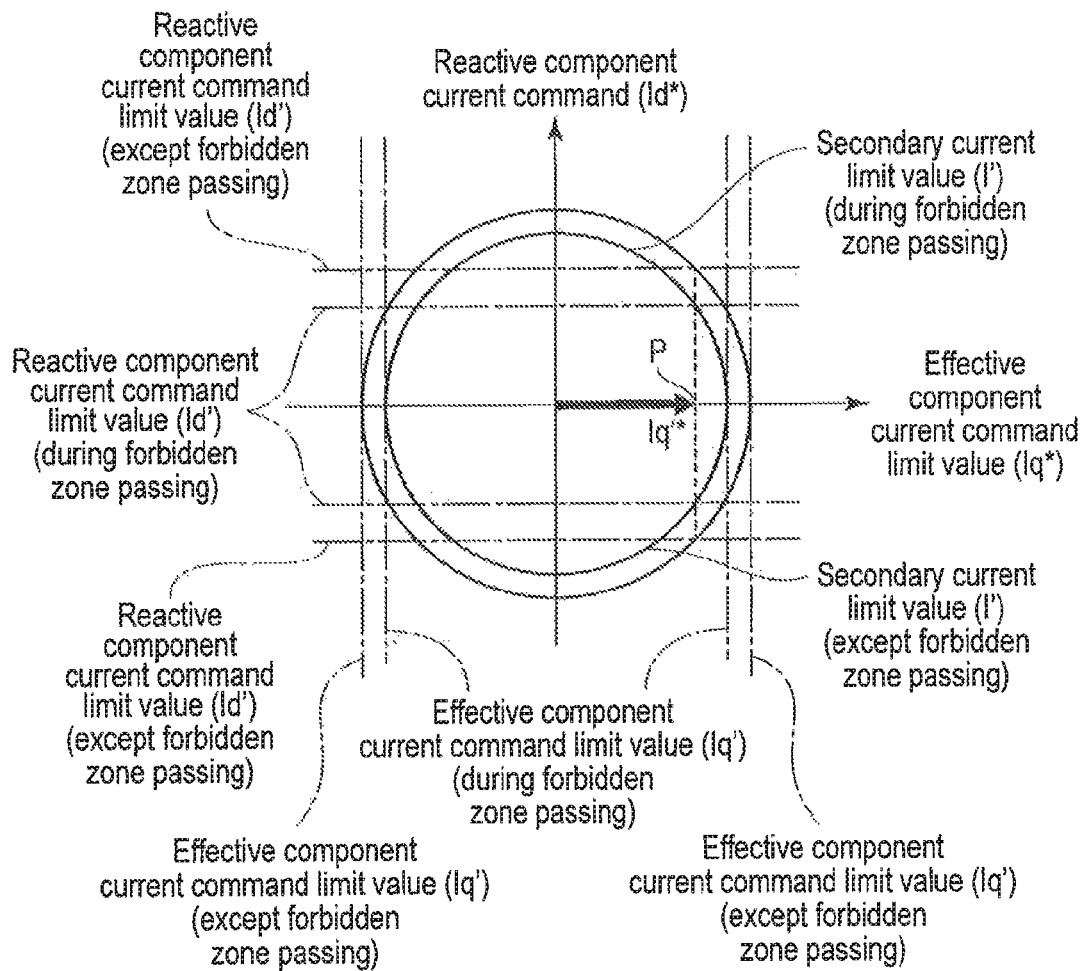
FIG. 7 is a graph showing the characteristic of a function different from that of FIG. 3.

As a result, a reactive component current command limit value generator 212 shown in FIG. 2 has a characteristic shown in FIG. 7 different from the characteristic in FIG. 3.

FIG. 7 shows the secondary current limit value I', an effective component current command limit value Iq', and a reactive component current command limit value Id' while the slip frequency passes through the forbidden zone and does not pass through the forbidden zone.

When the secondary current limit value I' becomes small while the slip frequency passes through the forbidden zone, a unit circle having the secondary current limit value I' as a radius becomes small. Intersections between the small unit circle and the straight line parallel to the ordinate and passing through a point P at which a limited effective component current command Iq'* on the abscissa is located come close to the abscissa. Therefore, the width of the reactive component current command limit value Id' becomes narrow.

According to the second embodiment, in addition to the effect of the first embodiment, a smaller limit value than the case in which the slip frequency does not pass through the forbidden zone is applied to the case in which the slip frequency passes through the forbidden zone. Therefore, the damage to the element can be more reliably prevented, and a more safe operation can continue.

Third Embodiment

The third embodiment will be described with reference to FIGS. 8 and 9.

The third embodiment can be practiced in combination with the first or second embodiment.

Different parts from the variable speed system (FIGS. 4, 5, 6, and 7) of the second embodiment will be mainly described below.

Figure 8:
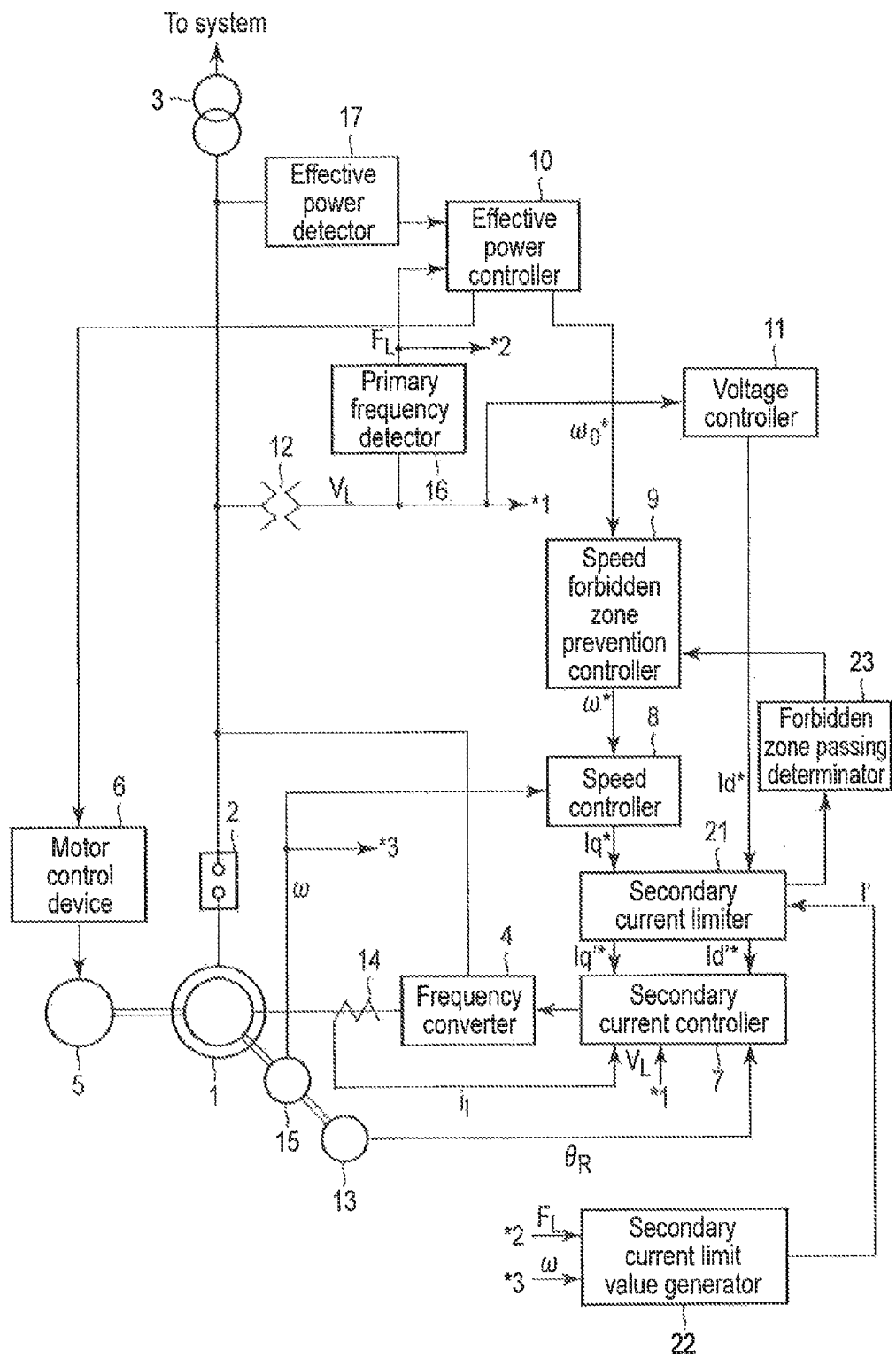
FIG. 8 is a block diagram showing an example of the arrangement of a variable speed system of secondary excitation including a variable speed control apparatus according to a third embodiment.

FIG. 8 is a block diagram showing an example of the arrangement of a variable speed system of secondary excitation including a variable speed control apparatus according to the third embodiment. The same reference numerals in FIG. 4 denote the same parts, and a repetitive description will be omitted.

The variable speed system according to the third embodiment in FIG. 8 includes a forbidden zone passing determinator 23 in addition to the arrangement of FIG. 4.

The forbidden zone passing determinator 23 receives a secondary current limit value I' and an effective component current command Iq* of the secondary current for a secondary current controller 7 from a secondary current limiter 21. The determinator 23 determines whether or not a rotation speed ω passes through a speed forbidden zone and changes (permission/inhibition of forbidden zone passing), based on the difference between the absolute value of the effective component current command Iq' and the secondary current limit value I'. The determinator 23 outputs a command indicating permission/inhibition of speed forbidden zone passing to a speed forbidden zone prevention controller 9.

When the absolute value of the effective component current command. Iq* exceeds or is equal to or more than a value obtained by adding a margin to the secondary current limit value I', the forbidden zone passing determinator 23 determines not to cause the rotation speed ω to pass through the forbidden zone and change.

Figure 9:
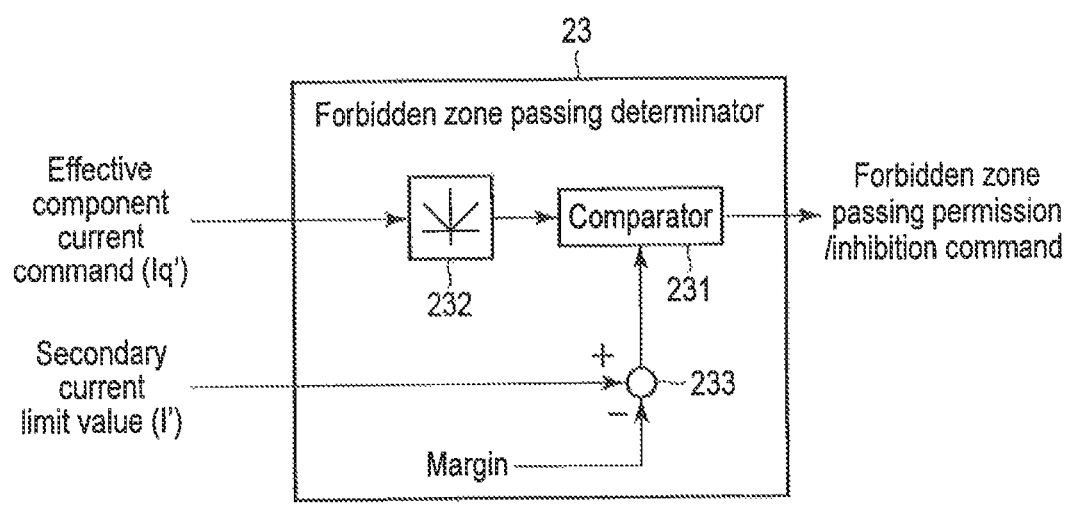
FIG. 9 is a block diagram showing an example of the internal arrangement of a forbidden zone passing determinator 23 shown in FIG. 8.

FIG. 9 is a block diagram showing an example of the internal arrangement of the forbidden zone passing determinator 23 shown in FIG. 8.

The forbidden zone passing determinator 23 includes a comparator 231, an absolute value operation unit 232, and a subtractor 233.

The absolute value operation unit 232 calculates the absolute value of the effective component current command Iq*.

The subtractor 233 calculates the value obtained by adding the margin to the secondary current limit value I'.

The comparator 231 compares the absolute value of the effective component current command Iq* calculated by the absolute value operation unit 232 with the value calculated by the subtractor 233 and obtained by adding the margin to the secondary current limit value I'.

If $|Iq^*| < (\text{or} \leq) I' - \text{margin}$, then forbidden zone passing is permitted. To the contrary, If $|Iq^*| \geq (\text{or} >) I' - \text{margin}$, then forbidden zone passing is inhibited.

Note that the margin may be a fixed value or may be calculated from an acceleration time constant Tj(s) of the generation motor and the motor and a forbidden zone passing rate (rotation speed change width Δω/time Δt [pu/s]:

Margin Calculation Example:

$$\text{margin} = Tj \times (\Delta\omega/\Delta t)$$

The command indicating permission/inhibition of forbidden zone passing is input to the speed forbidden zone prevention controller 9. Only when forbidden zone passing is permitted, a change in speed command value ω* to pass through the forbidden zone is permitted.

According to the third embodiment, in addition to the effect of the second embodiment, the permission/inhibition of forbidden zone passing is appropriately determined in accordance with the operation condition. The damage to the element during forbidden zone passing can be reliably prevented, and a more safe operation can continue.

As has been described above, according to each embodiment, even if a disturbance or the like occurs, the element of the frequency converter is not overloaded, and the safety operation can continue.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A variable speed control apparatus applied to a variable speed system of secondary excitation including a double feed synchronous machine mechanically connected to a motor and a frequency converter configured to supply a current to a secondary winding of the double feed synchronous machine, the variable speed control apparatus comprising:
   a secondary current controller configured to control an output current from the frequency converter; and
   a secondary current limiter configured to:
      limit an effective component current command and a reactive component current command of a secondary current for the secondary current controller by using a secondary current limit value, and
      output a limited effective component current command and a limited reactive component current command to the secondary current controller.

2. The apparatus according to claim 1, wherein the secondary current limiter comprises:
   an effective component current command limiter configured to limit the effective component current command using the secondary current limit value,
   a reactive component current command limit value generator configured to calculate a reactive component current command limit value from the secondary current limit value and the effective component current command limited by the effective component current command limiter, and
   a reactive component current command limiter configured to limit a reactive component current command using the reactive component current command limit value calculated by the reactive component current command limit value generator.

3. The apparatus according to claim 1, further comprising a secondary current limit value generator configured to generate the secondary current limit value used to limit the effective component current command and the reactive component current command in the secondary current limiter and output the secondary current limit value to the secondary current limiter.

4. The apparatus according to claim 3, wherein the secondary current limit value generator calculates a slip frequency from a rotation speed of the double feed synchronous machine and a primary frequency of the double feed synchronous machine and determines the secondary current limit value in accordance with the slip frequency.

5. The apparatus according to claim 4, wherein when the slip frequency does not pass through a predetermined zone, the secondary current limit value generator sets the secondary current limit value to a first value, and when the slip frequency passes through the zone, the secondary current limit value generator sets the secondary current limit value to a second value smaller than the first value.

6. The apparatus according to claim 1, further comprising a zone passing determinator configured to determine whether or not a rotation speed of the double feed synchronous machine passes through a predetermined zone and changes, based on a difference between the secondary current limit value and an absolute value of an effective component current command of a secondary current for the secondary current controller.

7. The apparatus according to claim 6, wherein when the absolute value of the effective component current command exceeds or is not less than a value obtained by adding a margin to the secondary current limit value, the zone passing determinator determines to inhibit that the rotation speed of the double feed synchronous machine passes through the zone and changes.

8. An operation method applied to a variable speed system of secondary excitation including a double feed synchronous machine mechanically connected to a motor and a frequency converter configured to supply a current to a secondary winding of the double feed synchronous machine, the operation method comprising:
   controlling an output current from the frequency converter by a secondary current controller;
   limiting an effective component current command and a reactive component current command of a second current for the secondary current controller by a secondary current limiter using a secondary current limit value; and
   outputting a limited effective component current command and a limited reactive component current command to the secondary current controller.

* * * * *